US009388753B2

(12) United States Patent
Prochaska et al.

(10) Patent No.: US 9,388,753 B2
(45) Date of Patent: Jul. 12, 2016

(54) GENERATOR CONTROL HAVING POWER GRID COMMUNICATIONS

(75) Inventors: James K. Prochaska, Spring, TX (US); Randall J. Kleen, Channelview, TX (US); Thomas E. Stowell, Houston, TX (US); Garland W. Ferguson, Houston, TX (US); Louis N. Hannett, Schenectady, NY (US); William S. Adams, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 2039 days.

(21) Appl. No.: 12/562,064

(22) Filed: Sep. 17, 2009

(65) Prior Publication Data

US 2011/0062708 A1 Mar. 17, 2011

(51) Int. Cl.
*H02P 9/04* (2006.01)
*F02D 29/06* (2006.01)

(52) U.S. Cl.
CPC ...................................... *F02D 29/06* (2013.01)

(58) Field of Classification Search
USPC ..... 290/7, 40 R, 40 C, 41, 51, 40 B; 700/287, 700/286
See application file for complete search history.

(56) References Cited

U.S. PATENT DOCUMENTS

| | | | | |
|---|---|---|---|---|
| 3,275,838 | A * | 9/1966 | Almstrom | 307/82 |
| 3,639,076 | A | 2/1972 | Rowen | |
| 4,308,463 | A | 12/1981 | Giras et al. | |
| 4,380,146 | A | 4/1983 | Yannone et al. | |
| 4,445,180 | A * | 4/1984 | Davis et al. | 700/289 |
| 5,552,640 | A * | 9/1996 | Sutton et al. | 290/40 B |
| 6,095,793 | A * | 8/2000 | Greeb | 431/12 |
| 6,365,982 | B1 * | 4/2002 | Iles et al. | 290/40 B |
| 6,816,757 | B1 * | 11/2004 | De La Ree et al. | 700/286 |
| 7,724,778 | B2 * | 5/2010 | Ying | 370/489 |
| 7,751,166 | B2 * | 7/2010 | Stoupis et al. | 361/64 |
| 8,188,610 | B2 * | 5/2012 | Scholte-Wassink | 290/44 |
| 2003/0015873 | A1 * | 1/2003 | Khalizadeh et al. | 290/7 |
| 2008/0039979 | A1 * | 2/2008 | Bridges et al. | 700/292 |
| 2008/0225452 | A1 * | 9/2008 | Stoupis et al. | 361/62 |
| 2009/0315329 | A1 * | 12/2009 | Duffey et al. | 290/44 |
| 2010/0292853 | A1 * | 11/2010 | McDonnell | 700/287 |
| 2011/0106325 | A1 * | 5/2011 | Opina et al. | 700/287 |

* cited by examiner

*Primary Examiner* — Julio Gonzalez
(74) *Attorney, Agent, or Firm* — Fletcher Yoder, P.C.

(57) ABSTRACT

A system is provided for controlling power generation. For example, the system may include a drive, an electrical generator coupled to the drive, and a controller coupled to the drive. The controller may include a stabilizing mode responsive to a utility signal representative of a grid destabilizing event.

20 Claims, 5 Drawing Sheets

GENERATOR CONTROL HAVING POWER GRID COMMUNICATIONS

BACKGROUND OF THE INVENTION

The subject matter disclosed herein relates to a power generation system, such as a power plant used for a utility grid A large load change on a utility grid or within an industrial facility can cause rapid destabilization of connected generators, particularly low inertia generators. Initially, in the first several seconds, the connected generators rapidly change in speed and operating frequency in response to the load change. If the load change is severe enough and the connected generators cannot adjust quickly enough, the resulting change in operating frequency can pass a threshold (e.g., +/−1 Hz on a 60 Hz system). Upon passing the threshold, the system may undergo large scale load shedding or generator tripping to protect the connected generators and loads and prevent a total system collapse. With the economic and public relations impact of blackouts, such frequency disturbances are critical to avoid.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a drive, an electrical generator coupled to the drive, and a controller coupled to the drive. The controller includes a stabilizing mode responsive to a utility signal representative of a grid destabilizing event.

In a second embodiment, a system includes an electrical generator controller having a stabilizing mode responsive to a utility signal representative of a grid destabilizing event. The stabilizing mode includes an override ramp profile to change a power output of an electrical generator to maintain a frequency of the electrical generator within upper and lower limits of a grid frequency.

In a third embodiment, a system includes a power grid generator configured to supply a power output to a power grid. The power grid generator includes a stabilizing mode responsive to a utility signal representative of a grid destabilizing event. The utility signal triggers the stabilizing mode within at least less than approximately 5 seconds of the grid destabilizing event, and the stabilizing mode has a power generation rate change of the power output.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
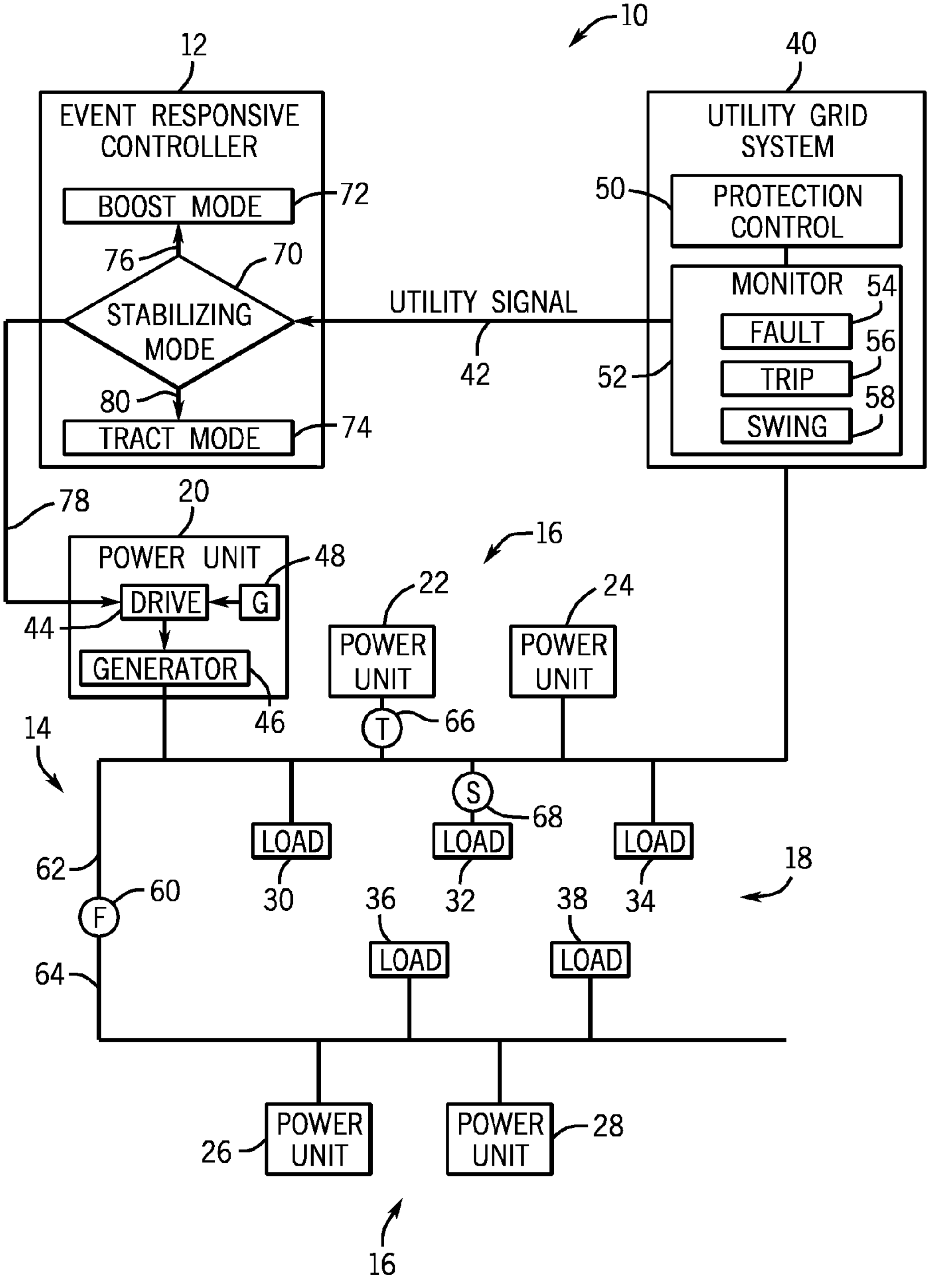
FIG. 1 is a block diagram of an embodiment of an electrical system having an event responsive controller configured to stabilize the electrical system in response to transient stability upsets.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed in detail below, the disclosed embodiments provide an event responsive controller configured to stabilize a power unit and/or a power grid in response to one or more grid destabilizing events, e.g., severe changes in load on the grid. A large load change on a power grid or within an industrial facility can cause rapid destabilization of connected power units, particularly low inertia aero-derivative turbine generators. Initially, in the first several seconds, the connected power units rapidly change in speed and operating frequency in response to the load change.

For example, if the load suddenly exceeds the available generator power on a power grid, then all connected power units may rapidly lose speed. Unit speed is directly proportional to system frequency on the power grid. If the frequency decays below a threshold (e.g., 59 Hz in a 60 Hz power grid), then the system may begin shedding loads and causing a blackout. In the embodiments discussed in detail below, the event responsive controller rapidly executes a boost mode to increase power output of the power units in response to such a grid destabilizing event, helping to reduce frequency decay before the threshold is exceeded in the system, and ultimately to restore frequency.

By further example, if the generated power suddenly exceeds the load on a power grid, then all connected power units may increase in speed and cause an increase in frequency. If a lighter inertia power unit accelerates faster than the rest of the power units, then its generator will slip poles and lose synchronism with the other power units, thereby causing a trip. In the embodiments discussed in detail below, the event responsive controller rapidly executes a tract mode to decrease power output in response to such a grid destabilizing event. In addition, the event responsive controller may vary the tract mode depending on the rotating inertia of the various power units. For example, the event responsive controller may provide a more rapid deceleration for a lighter inertia power unit as compared to a heavier inertia power unit. In this manner, the event responsive controller rapidly decreases the power output of connected power units to help minimize an over frequency condition on the power grid, while also reducing the possibility of pole slipping in a light inertia power unit.

FIG. 1 is a block diagram of an embodiment of an electrical system 10 having an event responsive controller 12 configured to stabilize the electrical system 10 in response to transient stability upsets. As illustrated, the electrical system 10 includes a power grid 14 coupled to distributed power units 16 and distributed loads 18. The distributed power units 16 may include a plurality of power units 20, 22, 24, 26, and 28. Each of these distributed power units 16 is configured to generate power for distribution on the power grid 14. The distributed loads 18 may include a plurality of loads 30, 32, 34, 36, and 38. Each of these distributed loads 18 is configured to draw power from the power grid 14 to operate machinery, buildings, and other systems. The illustrated electrical system 10 also includes a utility grid system 40 coupled to the power grid 14. For example, the utility grid system 40 may provide real-time monitoring of the power grid 14 to detect various grid destabilizing events, such as transient stability upsets, in the power grid 14. These transient stability upsets may correspond to severe changes in frequency or loading on the power grid 14. As discussed in further detail below, the utility grid system 40 is configured to detect these grid destabilizing events in real-time, and communicate a utility signal 42 to the event responsive controller 12 to trigger corrective control with one or more of the distributed power units 16.

The distributed power units 16 may include a variety of power generation systems configured to distribute power onto the power grid 14. For example, the distributed power unit 16 may include generators driven by a reciprocating combustion engine, a gas turbine engine, a steam turbine engine, a hydro-turbine, a wind turbine, and so forth. The distributed power unit 16 also may include large arrays of solar panels, fuel cells, batteries, or a combination thereof. The size of these distributed power units 16 also may vary from one unit to another. For example, one power unit 16 may have a substantially larger inertia than another unit on the power grid 14.

In the illustrated embodiment, the power unit 20 includes a drive 44 coupled to a generator 46. The power unit 20 also includes a governor 48, which may provide a proportional-acting control of the drive 44. The drive 44 is configured to rotate the generator 46 for power generation in response to control by the governor 48 and/or other internal control features. In certain embodiments, the drive 44 may include a low rotating inertia engine, such as a gas turbine engine. For example, the drive 44 may include an aero-derivative gas turbine engine, such as an LM1600, LM2500, LM6000, or LMS100 aero-derivative gas turbine engine manufactured by General Electric Company of Schenectady, N.Y. However, the drive 44 may be any suitable mechanism for rotating the generator 46. As discussed in further detail below, the drive 44 may rapidly change in speed in response to a severe change in load on the power grid 14, thereby causing a rapid change in frequency of power output from the generator 46 onto the power grid 14. Thus, the event responsive controller 12 is configured to override the governor 48 and control the drive 44 to stabilize the power unit 20 in response to the utility signal 42 from the utility grid system 40.

The distributed loads 18 may include a variety of equipment and facilities on the power grid 14. For example, the distributed loads 18 may include residential homes, commercial buildings, industrial facilities, transportation systems, and individual equipment. In general, these distributed loads 18 may gradually change electrical demand over each 24 hour period. For example, peak demand may generally occur at midday, while minimum demand may generally occur at midnight. Over the course of the day, the electrical demand by these distributed loads 18 may generally increase in the morning hours, and subsequently decrease in the afternoon hours. The distributed power units 16 are generally able to respond to these gradual changes in electrical demand on the power grid 14. Unfortunately, rapid load swings on the power grid 14 may create a substantial gap between the electrical power supplied by the distributed power unit 16 and the electrical demand by the distributed loads 18. As a result, a large decrease in load may cause the power units 16 to accelerate, thereby increasing system frequency. Likewise, a large increase in load may cause the power units to decelerate, thereby decreasing system frequency. As discussed in further detail below, the event responsive controller 12 is configured to maintain the system frequency within upper and lower limits despite significant load swings and other destabilizing events on the power grid 14.

In the illustrated embodiment, the utility grid system 40 is configured to provide real-time monitoring and control throughout the power grid 14. For example, the utility grid system 40 may include a protection control 50 and a monitor 52, which collectively provide rapid event identification and corrective actions based on various grid destabilizing events throughout the power grid 14. For example, the monitor 52 may include a fault monitor 54, a trip monitor 56, and a swing monitor 58. The fault monitor 54 may be configured to rapidly identify a fault, such as a transmission line fault 60, in the power grid 14. The fault 60 may represent a discontinuity in first and second portions 62 and 64 of the power grid 14. As a result, the transmission line fault 60 may disconnect loads 36 and 38 and power units 26 and 28 from the first portion 62 of the power grid 14. The trip monitor 56 may be configured to identify a trip of one or more of the distributed power units 16, such as a trip 66 of the power unit 22. As a result of the trip 66, the electrical power demand by the distributed loads 18 may suddenly exceed the available power by the distributed power units 16. The swing monitor 58 may be configured to identify rapid changes in electrical demand by one or more of the distributed loads 18, such as a swing 68 in the load 32. For example, the swing 68 may represent a sudden increase or decrease in electrical demand in certain equipment, industrial facilities, or the like.

In each instance, the utility grid system 40 may evaluate changes on the power grid 14 against preselected thresholds, e.g., a wattage change per unit of time. In general, the fault 60, the trip 66, and the swing 68 each represent a grid destabilizing event, which the monitor 52 rapidly or immediately identifies and communicates to the event responsive controller 12 via the utility signal 42. For example, the utility grid system 40 may identify a grid destabilizing event and transmit the utility signal 42 in short time frame between approximately 0 and 10 seconds, 0 and 5 seconds, or 0 and 1 second. In certain embodiments, the utility grid system 40 may identify a grid destabilizing event and transmit the utility signal 42 within less than 10 50, 100, 200, 300, 400, or 500 milliseconds.

Upon receiving the utility signal 42, the event responsive controller 12 may take immediate action to stabilize the power unit 20. For example, the illustrated event responsive controller 12 may include a plurality of different stabilizing modes corresponding to different conditions on the power grid 14. In the illustrated embodiment, the event responsive controller 12 includes a stabilizing mode processor 70 configured to receive and evaluate the utility signal 42 and select from available stabilizing modes, such as a boost mode 72 and a tract mode 74. The boost mode 72 may correspond to a rapid increase in speed and power of the power unit 20, whereas the tract mode 74 may correspond to a rapid decrease in speed and power of the power unit 20. Each of these modes 72 and 74 is configured to stabilize the power unit 20 in response to a grid destabilizing event on the power grid 14, as indicated by the utility signal 42. In the illustrated embodiment, the event responsive controller 12 is configured to provide real-time responsiveness to the utility signal 42. For example, the event responsive controller 12 may initiate a grid stabilizing mode within less than 10 50, 100, 200, 300, 400, or 500 milliseconds of receiving the utility signal 42 or of detection of the grid destabilizing event. However, certain embodiments of the event responsive controller 12 may initiate the grid stabilizing mode within between approximately 0 and 10 seconds, 0 and 5 seconds, or 0 and 1 second of receiving the signal 42 or of detection of the grid destabilizing event.

If the stabilizing mode processor 70 indicates a need for a rapid boost to stabilize the power grid 14, then the stabilizing mode processor 70 may trigger the boost mode 72 as indicated by arrow 76. Thus, the stabilizing mode processor 70 may utilize the boost mode 72 to send a command signal 78 to the drive 44 of the power unit 20, thereby rapidly boosting the drive speed to maintain the system frequency within limits. For example, the stabilizing mode processor 70 may trigger the boost mode 72 in response to the trip 66 of the power unit 22 as identified by the trip monitor 56 or the transmission line fault 60 as indicated by the fault monitor 54.

If the stabilizing mode processor 70 identifies a need for a power reduction in response to the utility signal 42, then the stabilizing mode processor 70 may trigger the tract mode 74 as indicated by arrow 80. In turn, the stabilizing mode processor 70 may send the command signal 78 to the drive 44 of the power unit 20, thereby rapidly decreasing the drive speed and power output from the power unit 20. In this manner, the tract mode 74 is able to maintain the frequency of the power unit 20 within acceptable limits. For example, the stabilizing mode processor 70 may trigger the tract mode 74 in response to the transmission line fault 60 as identified by the fault monitor 54 or a downward load swing 68 on the load 32 as indicated by the swing monitor 58.

In the disclosed embodiments, the event responsive controller 12 may be particularly useful in small power grids, such as isolated power grids having less than 1,000 MW. For example, a small isolated power grid may range between 100 to 1,000 MW or between 200 to 500 MW. In some instances, the small isolated power grid 14 may be less than 50, 100, 200, or 300 MW. In these small isolated power grids 14, the grid destabilizing event may correspond to a change in power or load of greater than 5, 10, 15, 20, 25, or 30 percent. For example, a trip of one power unit 22 may immediately drop 10 to 20 percent of the total power on the power grid 14. In response to this grid destabilizing event, the utility grid system 40 rapidly communicates the utility signal 42 to the event responsive controller 12, which then rapidly commands 78 the power unit 20 to take corrective actions based on the suitable boost mode 72 or tract mode 74.

Figure 2:
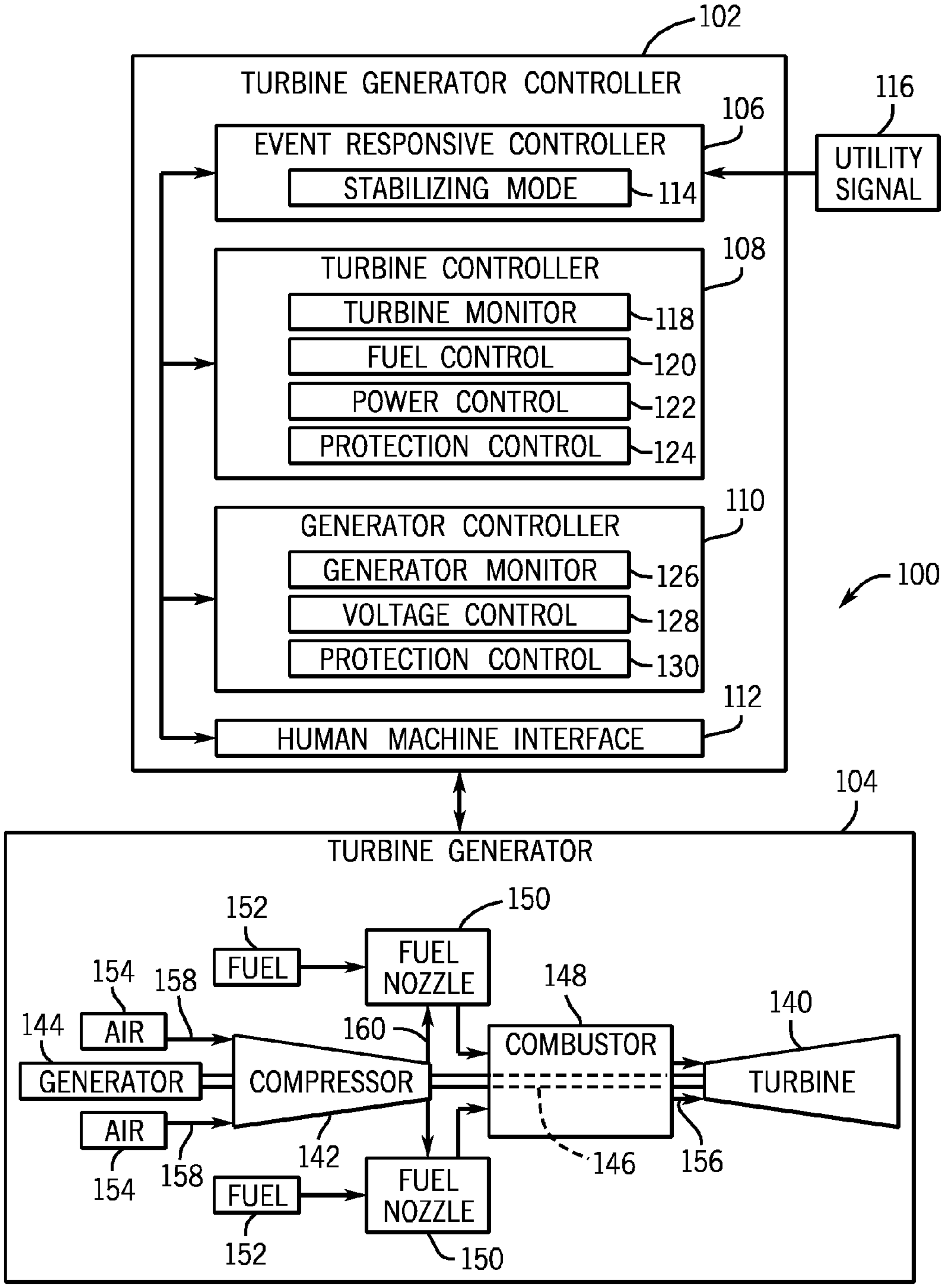
FIG. 2 is a block diagram of an embodiment of a turbine generator system having an event responsive controller.

FIG. 2 is a block diagram of an embodiment of a turbine generator system 100 having a turbine generator controller 102 coupled to a turbine generator 104. As illustrated, the turbine generated controller 102 includes an event responsive controller 106, a turbine controller 108, a generator controller 110, and a human machine interface 112. As discussed in further detail below, the event responsive controller 106 includes one or more stabilizing modes 114 configured to stabilize operation of the turbine generator 104 in response to a utility signal 116, such as the utility signal 42 from the utility grid system 40 as shown in FIG. 1. In addition, the turbine controller 108 includes a variety of monitors and controls, such as a turbine monitor 118, a fuel control 120, a power control 122, and a protection control 124. The illustrated generator controller 110 also may include a variety of monitors and controls, such as a generator monitor 126, a voltage control 128, and a protection control 130. The monitors and controls of the turbine controller 108 and the generator controller 110 are configured to monitor and control features of the turbine generator 104, along with the event responsive controller 106.

In the illustrated embodiment, the turbine generator 104 includes a turbine 140 coupled to a compressor 142 and an electrical generator 144 via one or more shafts 146. As appreciated, the illustrated turbine 140 may include one or more turbine stages, and the compressor 142 may include one or more compressor stages. The turbine generator 104 also includes one or more combustors 148 and fuel nozzles 150 configured to combust a mixture of fuel 152 and air 154, and deliver hot combustion gases 156 to the turbine 140. In particular, the compressor 142 is driven by the turbine 140 to compress air 154 at an upstream air intake 158, and then deliver compressed air 160 to the one or more combustors 148 and fuel nozzles 150. For example, the fuel nozzles 150 may transmit the compressed air 160 and the fuel 152 into the combustor 148 in a suitable mixture for combustion. The mixture of fuel and air then combusts within the combustor 148, thereby producing hot combustion gases 156 flowing into the turbine 140. The hot combustion gases 156 drive turbine blades within the turbine 140 to rotate the shaft 146, thereby driving both the compressor 142 and the generator 144. In certain embodiments, the turbine engine may be an aero-derivative gas turbine engine, such as an LM1600, LM2500, LM6000, or LMS100 aero-derivative gas turbine engine manufactured by General Electric Company of Schenectady, N.Y. Thus, the turbine generator 104 may be configured to generate up to approximately 14 to 100 MW, 35 to 65 MW, or 40 to 50 MW of electricity. For example, the LM2500 engine may be configured to generate up to approximately 18 to 35 MW, the LM6000 engine may be configured to generate up to approximately 40 to 50 MW, and the LMS100 engine may be configured to generate up to approximately 100 MW.

The turbine generator controller 102 provides monitoring and control of various features of the turbine generator 104. For example, the turbine monitor 118 of the turbine controller 108 may monitor rotational speed, vibration, temperature, pressure, fluid flow, noise, and other parameters of the turbine 140, the compressor 142, the combustor 148, and so forth.

The fuel control 120 of the turbine controller 108 may be configured to increase or decrease fuel flow to the one or more fuel nozzles 150, thereby changing the combustion dynamics within the combustor 148 and in turn operation of the turbine 140. For example, the fuel control 120 may reduce the fuel flow rate to the fuel nozzles 150 to reduce the combustion in the combustor 148, and therefore reduce the speed of the turbine 140. Likewise, the fuel control 120 may increase the fuel flow rate to the fuel nozzles 140 to increase the combustion in the combustor 148, and therefore increase the speed of the turbine 140. The fuel control 120 also may vary other characteristics of the fuel injection depending on the number and configuration of fuel nozzles 150. For example, the fuel control 120 may adjust multiple independent fuel lines to different fuel nozzles 150 to vary the characteristics of combustion within the combustor 148. As illustrated in FIG. 2, blocks 152 may correspond to common or independent fuel lines, manifolds, or fuel governors. In response to a grid destabilizing event, the event responsive control 106 may control various aspects of the fuel control 120.

The power control 122 of the turbine controller 108 may be configured to increase or decrease power output of the turbine 140. For example, the power control 122 may monitor and/or control various operational parameters of the compressor 142, the fuel nozzles 150, the combustor 148, the turbine 140, and external loads (e.g., the generator 144). In particular, the power control 122 may cooperate with the fuel control 120 to adjust fuel flow, thereby adjusting combustion. The power control 122 also may control flow of multiple fuels (e.g., gas and/or liquid fuels), air, water, nitrogen, or various other fluids for various reasons, including performance, emissions, and so forth. For example, the power control 122 may selectively enable a gas fuel flow, a liquid fuel flow, or both depending on various conditions and available fuel. By further example, the power control 122 may selectively enable a low BTU fuel or a high BTU fuel depending on the power requirements. Likewise, the power control 122 may selectively enable water flow, nitrogen flow, or other flows to control emissions. In response to a grid destabilizing event, the event responsive control 106 may control various aspects of the power control 122 to adjust power output, which in turn controls the electrical output from the generator 144.

The protection control 124 of the turbine controller 108 may execute corrective actions in response to events indicative of potential damage, excessive wear, or operational thresholds. For example, if the turbine monitor 118 identifies excessive vibration, noise, or other indicators of potential damage, the protection control 124 may reduce speed or shut down the turbine generator 104 to reduce the possibility of further damage. In certain embodiments, the protection control 124 of the turbine controller 108 may include clearance control, which may provide control of clearance between rotating and stationary components, e.g., in the turbine 140 and/or the compressor 142. For example, the clearance control may increase or decrease a coolant flow through the turbine 140 or the compressor 142 to change the thermal expansion or contraction of stationary parts, thereby expanding or contracting the stationary parts (e.g., shroud segments) about the rotating blades. In this manner, the clearance control may increase or decrease the clearance between the rotating blades and the stationary parts in the turbine 140 and the compressor 142. Alternatively, the clearance control may control other clearance mechanisms within the turbine 140 or the compressor 142, such as a drive mechanism coupled to the stationary parts disposed about the rotating blades within the turbine 140 or the compressor 142.

The generator controller 110 also may have a variety of monitor controls to improve performance and reliability of the power output from the turbine generator 104. For example, the generator monitor 126 may monitor the various power characteristics of the generator 144, such as voltage, current, and frequency. The generator monitor 126 also may monitor various characteristics indicative of wear or damage, such as vibration, noise, or winding faults. The voltage control 128 may be configured to process and filter the electrical output from the generator 144, thereby providing the desired electrical output to the power grid.

The protection control 130 may be configured to take corrective actions in response to feedback from the generator monitor 126, thereby reducing the possibility of damage or excessive damage to the generator 144 or the turbine generator 104 as a whole. For example, the protection control 130 may disconnect the generator 144 from the turbine generator 104, disconnect loads from the generator 144, or shut down the turbine generator 104 in response to excessive vibration or noise identified by the generator monitor 126. The generator monitor 126, voltage control 128, and protection control 130 also may cooperate with the event responsive controller 106 to ensure stable operation of the turbine generator 104 in response to the utility signal 116.

In certain embodiments, the event responsive control 106 is configured to execute the stabilizing mode 114 in response to the utility signal 116 in a manner overriding the normal controls of the turbine controller 108. In other words, the event responsive controller 106 may take accelerated actions that are not possible by the turbine controller 108. The turbine generator controller 102 may receive the utility signal 116 in real-time relative to the occurrence of a grid destabilizing event on the power grid. For example, the event responsive controller 106 may receive the utility signal 116 at a time within approximately 0 to 10 seconds, or least less than approximately 1, 2, 3, 4, 5, 6, 7, 8, 9, or 10 seconds, of the grid destabilizing event. In certain embodiments, the event responsive controller 106 may receive the utility signal 116 within a fraction of a second, e.g., less than approximately 10, 50, 100, 200, 300, 400, or 500 milliseconds of the grid destabilizing event. However, the response time may vary between implementations and grid destabilizing events, among other factors. In turn, the event responsive controller 106 may execute the stabilizing mode 114 in real-time to provide a rapid boost or tract in the speed and power output of the turbine generator 104. For example, the event responsive controller 106 may respond within at least less than approximately 10, 50, 100, 200, 300, 400, or 500 milliseconds of receiving the utility signal 116. However, the transmission time of the utility signal 116 and the response time of the event responsive controller 106 may vary across implementations. Nevertheless, the event responsive controller 106 is configured to rapidly increase or decrease the speed and power of the turbine generator 104 beyond normal control rates of the turbine controller 108. For example, the increase or decrease in speed and power output of the turbine generator 104 may be at least greater than approximately 2, 3, 4, 5, 6, 7, 8, 9, or 10 times greater than the normal acceleration or deceleration of the turbine generator 104. However, these changes in speed and power output of the turbine generator 104 may vary between implementations and grid destabilizing events, among other factors.

The event responsive controller 106 may include a uniquely programmed computing device, such as a programmed computer system or controller circuit board, having stabilizing instructions that are executable in response to the utility signal 116. For example, the stabilizing mode 114 may include boost mode stabilizing instructions and tract mode stabilizing instructions programmed onto the computing device. In certain embodiments, the boost mode may be described as a proactive boost (i.e., ProBoost) configured to actively boost the speed and power output of the turbine generator 104 in response to the real-time utility signal 116 indicative of a grid destabilizing event on the power grid. Likewise, the tract mode may be described as a proactive tract (i.e., ProTract) configured to actively decrease the speed and power output of the turbine generator 104 in response to the real-time utility signal 116 indicative of a grid destabilizing event on the power grid. Again, the particular stabilizing mode 114 may depend on the type and severity of the grid destabilizing event indicated by the utility signal 116. For example, a loss of power generators or an increase in loads beyond a threshold may trigger the event responsive controller 106 to execute the boost mode. Likewise a transmission line fault or a substantial decrease in loads on the power grid may trigger the event responsive controller 106 to execute the tract mode. In either case, the stabilizing mode 114 may accelerate or decelerate the turbine generator 104 according to a suitable ramp path or control profile, which may be greater or lesser depending on the severity of the grid destabilizing event. In addition, as discussed in further detail below, the stabilizing mode 114 may vary depending on the current state of the turbine generator 104. If the turbine generator 104 is currently operating at full load or design limits, then the stabilizing mode 114 may be configured to temporarily exceed the design limits in a boost mode to stabilize the turbine generator 104.

Figure 3:
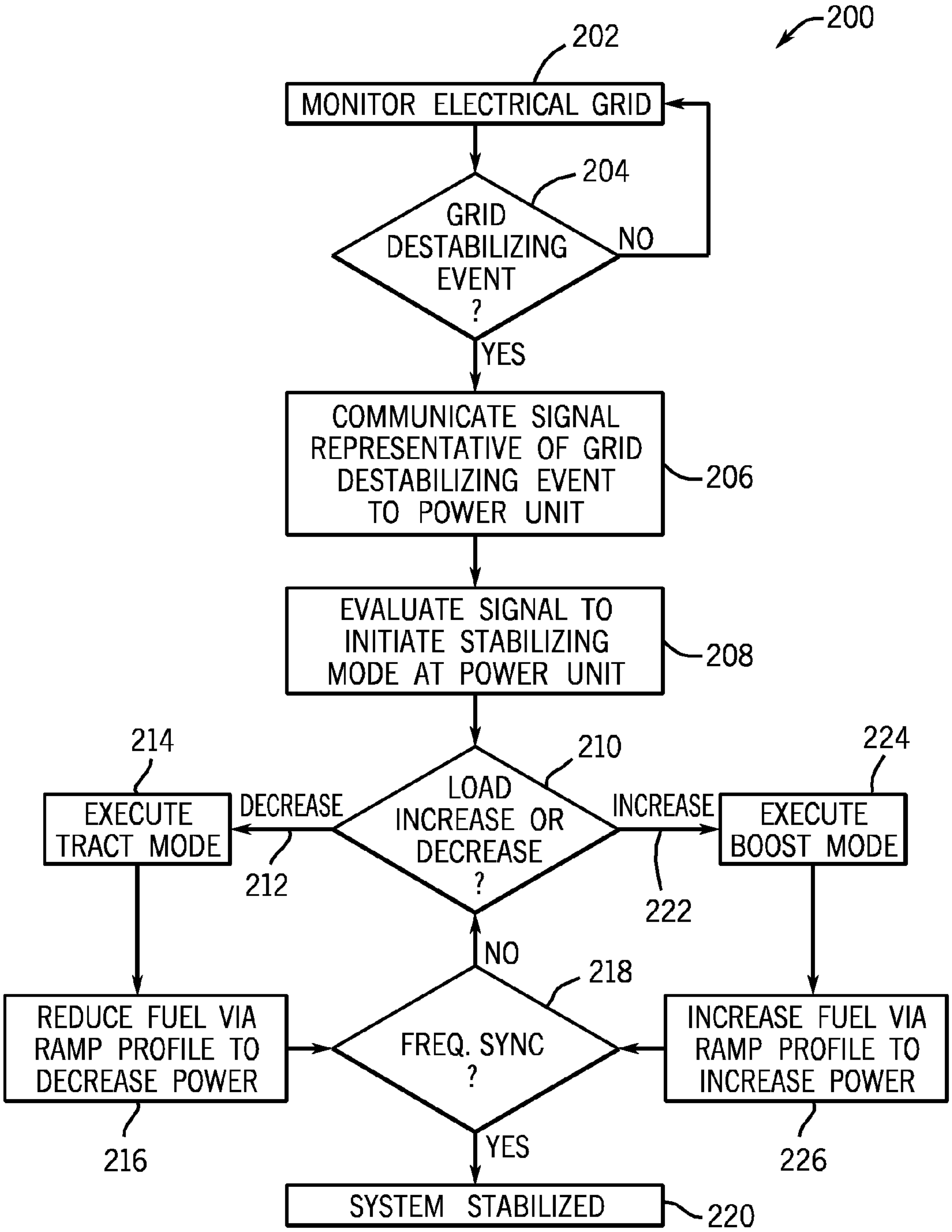
FIG. 3 is a flowchart of an embodiment of a grid stabilizing process to provide real-time control responsive to grid destabilizing events on a power grid.

FIG. 3 is a flowchart of an embodiment of a grid stabilizing process 200 to provide real-time control responsive to grid destabilizing events on a power grid. In the illustrated embodiment, the process 200 monitors an electrical grid at block 202 and analyzes feedback for a possible grid destabilizing event at block 204. If block 204 does not identify a grid destabilizing event based on monitor feedback, then the process 200 continues to monitor the electrical grid at block 202. Otherwise, if block 204 does identify a grid destabilizing event based on monitor feedback, then the process 200 proceeds to communicate a signal representative of the grid destabilizing event to one or more power units on the grid, as indicated by block 206. For example, the process 200 may communicate the signal from a high speed utility grid monitoring and protection system to one or more power generation systems, such as the distributed power units 16 of FIG. 1 or the turbine generator system 100 of FIG. 2. The process 200 may then evaluate the signal to initialize an appropriate stabilizing mode at the power unit as indicated by block 208.

At block 210, each power unit receiving the signal may evaluate whether the signal represents a load increase or load decrease on the power grid as indicated by block 210. If block 210 indicates a decrease 212 in load on the power grid, then the process 200 may execute a tract mode 214 as discussed above. In particular, the process may reduce fuel (e.g., close fuel control valve) via an appropriate ramp profile to decrease power at the power unit as indicated by block 216. The process 200 may then evaluate whether the frequency of the power unit is synchronized with the frequency of the power grid at block 218. If the frequencies are synchronized with one another at block 218, then the system is stabilized at block 220. At this point, the process 200 may continue to monitor the electrical grid at 202. Otherwise, if block 218 does not indicate synchronization of frequencies, then the process 200 may repeat by evaluating the load at block 210 and executing the appropriate stabilization mode.

If block 210 indicates a load increase 222 on the power grid, then the process 200 may proceed to execute a boost mode as indicated by block 224. For example, the process 200 may increase fuel (e.g., open fuel control valve) of the power unit via a suitable ramp profile to increase power as indicated by block 226. The process may then evaluate the frequency of the power unit against the frequency of the power grid at block 218. Again, if block 218 indicates synchronization of frequencies, then the system is stabilized at block 220. Otherwise, if the frequencies are not synchronized with one another, then the process repeats at block 210 by taking an appropriate stabilization action depending on whether the load increased or decreased on the power grid.

In the illustrated embodiment of FIG. 3, the various steps of the process 200 may be programmed onto a suitable computing device, such as a computer system, a controller board, memory, or the like. The process 200 may vary the ramp profiles 216 and 226 of the tract mode 214 and the boost mode 224 depending on the severity of the grid destabilizing event. For example, the process 200 may increase the slope of the ramp profiles for a more severe destabilizing event, while reducing the slope of the ramp profiles for a less severe grid destabilizing event. The ramp profiles may correspond to a power output change per time from the power unit of approximately 0 to 2 MW per second, 0.5 to 1.5 MW per second, or 0.75 to 1.25 MW per second. For example, the ramp profile may increase or decrease the power output from the power unit by approximately 50 to 200 MW per minute, or at least greater than approximately 50, 60, 70, 80, 90, 100 MW per minute. The duration of the ramp profile also may vary depending on the severity of the grid destabilizing event. For example, the duration of the ramp profile may range between approximately 5 to 120 seconds, 10 to 60 seconds, or 15 to 45 seconds. In certain embodiments, the duration of the ramp profile may be at least less than approximately 30, 45, 60, or 90 seconds. The ramp profile also may vary depending on the current operational state of the power unit. In other words, the ramp profile may vary depending on whether the power unit is operating at 25, 50, 75, or 100 percent load (or any state from 0 to 100 percent load) at the time of the grid destabilizing event. If the power unit is operating at less than 100 percent load, then the ramp profile may rapidly increase or decrease between 100 percent and 0 load on the power unit. However, if the power unit is operating at 100 percent load at the time of the grid destabilizing event, then the process 200 may temporarily boost the speed and power output of the power unit above the normal limit of the power unit for a short duration of time. As appreciated, the foregoing numerical examples may vary between implementations and grid destabilizing events, among other factors. Several ramp profiles are discussed with reference to the following figures.

Figure 4:
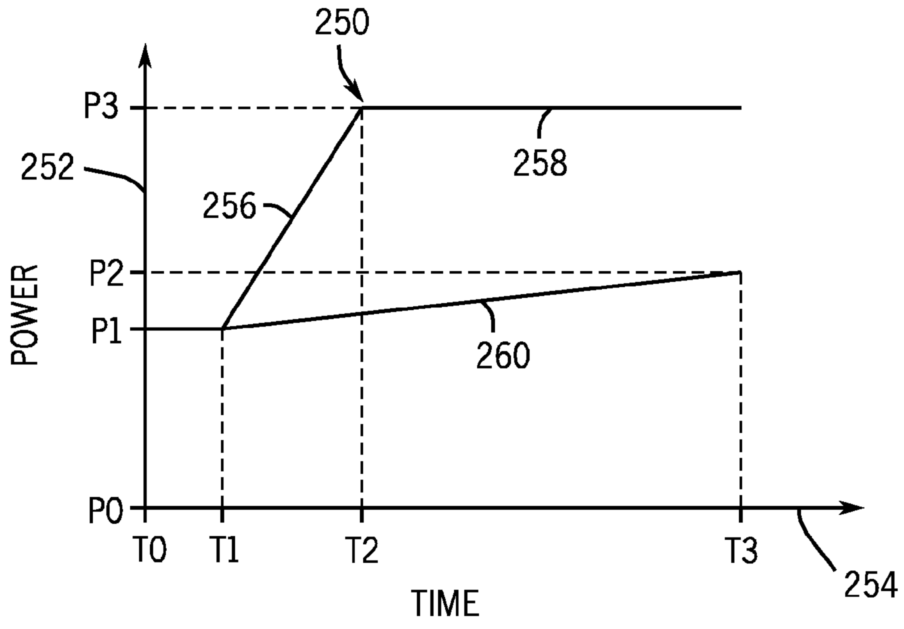
FIG. 4 is a graph of generator power versus time of a boost mode of an event responsive controller, illustrating an upward ramp profile, when a turbine generator unit is initially operating below its control limit, i.e., part load.

FIG. 4 is a graph of an upward ramp profile 250 of power 252 versus time 254 of a boost mode of an event responsive controller, wherein the upward ramp profile 250 may be used when a power unit is operating below a normal control limit (i.e., below 100 percent load). Thus, the illustrated upward ramp profile 250 may be described as a sub-control limit ramp profile 250 of power 252 versus time 254. The upward ramp profile 250 is configured to stabilize the power unit and/or the power grid, e.g., by maintaining synchronization of frequencies.

At a time T0 to T1, a power unit may be operating at a power level of approximately P1. At the time T1, the ramp profile 250 may initiate a rapid boost ramp 256 in response to a grid destabilizing event. At time T2, the rapid boost ramp 256 may reach a power level P3 and the ramp profile 250 may then hold the power level along a level path 258. In certain embodiments, the power level P1 may correspond to a power level of approximately 0 to 90 percent, 10 to 80 percent, 20 to 60 percent, or 30 to 50 percent of full load. The power level P3 may correspond to a control limit or 100 percent load condition of the power unit. However, the power level P3 of the level path 258 may be above or below the control limit of the power unit in certain embodiments as discussed in detail below. The duration of the rapid boost ramp 256 may vary depending on the severity of the grid destabilizing event, limitations of the power unit, and other factors. However, the duration may range between approximately 0 to 120 seconds, 5 to 60 seconds, or 10 to 30 seconds. Accordingly, the slope of the rapid boost ramp 256 may be approximately 0 to 2 MW per second, 0.5 to 1.5 MW per second, or 0.75 to 1.25 MW per second in various implementations. For example, the illustrated rapid boost ramp 256 may increase from approximately 25 MW to approximately 50 MW in approximately 15 seconds.

In contrast, without the unique event responsive controller of the disclosed embodiments, the power unit may slowly respond to deviations in the frequency using a proportional acting control scheme as indicated by a governor profile 260 (e.g., governor droop). In other words, the governor profile 260 is not responsive to a utility signal from the power grid, but rather it is only responsive to actual changes in frequency on the power unit. Unfortunately, after changes have already occurred in the system, the governor profile 260 may be ineffective at stabilizing the system. The governor profile 260 is substantially slower than the ramp profile 250 of the event responsive controller. For example, the governor profile 260 may have a slope corresponding to a 100 percent change in load over approximately 4 minutes, whereas the rapid boost ramp 256 of the ramp profile 250 may provide a slope with a 100 percent change in load over less than approximately 15, 30, 45, or 60 seconds. For example, a 4 percent governor droop function of the governor profile 260 may provide a 100 percent change in output with a 4 percent change in frequency.

The rapid boost ramp 256 is responsive to the utility signal in real-time, rather than waiting for actual changes in frequency to occur. Accordingly, upon identification of a grid destabilizing event, the utility signal triggers the ramp profile 250 to initiate the rapid boost ramp 256 to counteract the expected changes in frequency prior to substantial changes in the frequency. For example, the rapid boost ramp 256 may begin within less than approximately 1, 2, 4, 4, or 5 seconds, or even fractions of a second, after an occurrence of a grid destabilizing event. In addition, the rapid boost ramp 256 may have a slope of approximately 50 to 200 MW per minute. For example, the slope of the rapid boost ramp 256 may be at least up to approximately 0.75 to 2 MW per second or approximately 1 MW per second. In one embodiment, the slope of the rapid boost ramp 256 may be approximately 80 MW per minute. Thus, the slope of the rapid boost ramp 256 may be at least greater than 2, 3, 4, or 5 times the slope of the governor profile 260.

Figure 5:
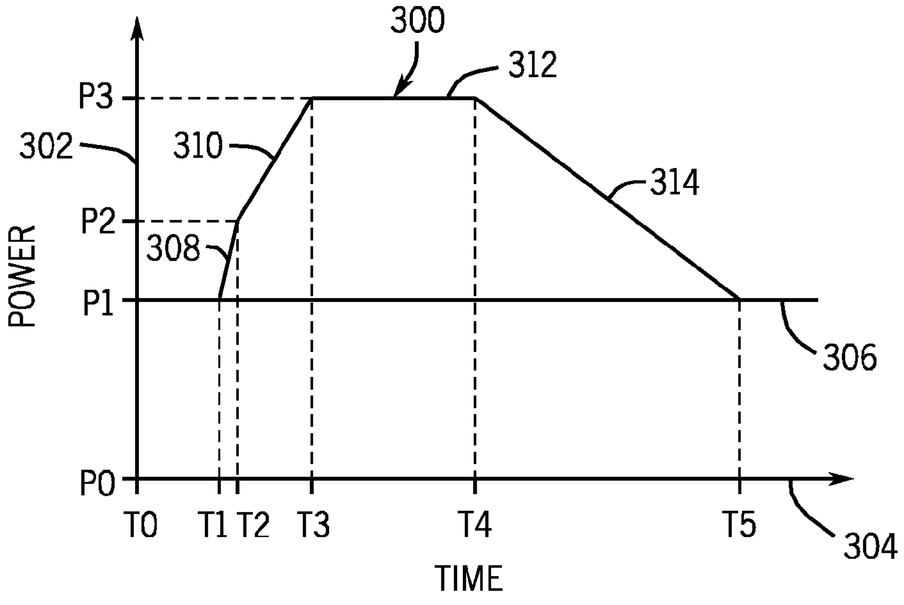
FIG. 5 is a graph of generator power versus time of a boost mode of an event responsive controller, illustrating an over control limit ramp profile, when a turbine generator unit is initially operating at its control limit, i.e., normal full load.

FIG. 5 is a graph of an upward ramp profile 300 of power 302 versus time 304 of a boost mode of an event responsive controller, wherein the upward ramp profile 300 may be used when a power unit is operating at or near a normal control limit (i.e., 100 percent load). Thus, the illustrated upward ramp profile 300 may be described as an over control limit ramp profile 300 of power 302 versus time 304. The upward ramp profile 300 is configured to stabilize the power unit and/or the power grid, e.g., by maintaining synchronization of frequencies.

In the illustrated embodiment, the ramp profile 300 increases and subsequently decreases in power 302 versus time 304 in response to a grid destabilizing event indicated by a utility signal. The power unit may be initially operating at a 100 percent load or control limit 306 upon initiation the ramp profile 300. For example, the control limit 306 may be at a power level P1, which corresponds to 100 percent normal operating power of the power unit. At a time T1, the ramp profile 300 may initiate a first boost path 308 having a first slope to raise the power 302 from the power level P1 to a power level P2. At a time T2, the ramp profile 300 may transition from the first boost path 308 to a second boost path 310 having a second slope. The second boost path 310 raises the power 302 from the power level P2 to a power level P3. At a time T3, the ramp profile 300 may level off and follow a level path 312 along the power level P3. At a time T4, the ramp profile 300 may decrease along a return path 314 back toward the control limit 306, thereby reducing the power 302 from the power level P3 to the power level P1.

The illustrated ramp profile 300 has two different slopes for the first and second boost paths 308 and 310, and a single slope for the return path 314. However, embodiments of the profile 300 may include any number of slopes (e.g., 1 to 10) during the boost from the control limit 306 to the level path 312, as well as during the return from the level path 312 to the control limit 306. Although the ramp profile 300 is illustrated as a series of linear paths, the ramp profile 300 may have any suitable combination of linear or non-linear paths. For example, the ramp profile 300 may curve upward and downward relative to control limit 306.

In the illustrated embodiment, the ramp profile 300 may be initiated in real-time relative to the identification of the grid destabilizing event. For example, the ramp profile 300 may initiate the first boost path 308 at a time between approximately 0 to 10 seconds, or at least less than approximately 1, 2, 3, 4, 5, 6, 7, 8, 9, or 10 seconds, after the occurrence of the grid destabilizing event. In some embodiments, the first boost path 308 may begin at a time of less than approximately 100, 200, 300, 400, or 500 milliseconds after the occurrence of the grid destabilizing event. As illustrated, the first and second boost paths 308 and 310 rapidly boost the power 302 from the control limit 306 (i.e., power level P1) to the level path 312 (i.e., power level P3). Given that the ramp profile 300 exceeds the control limit 306, the level path 312 may be limited to the power level P3 based on various design considerations. For example, the power level P3 may be set at a power up to approximately 5, 10, 15, 20, or 25 percent over the control limit 306, or a power boost up to approximately 1, 2, 3, 4, 5, 6, 7, 8, 9, or 10 MW over the control limit 306. As appreciated, the foregoing numerical examples may vary between implementations and grid destabilizing events, among other factors.

A duration of the ramp profile 300 corresponds to the difference between times T1 and P5. This duration of the ramp profile 300 may be selected to limit any possible detrimental impact on the power unit due to operation above the control limit 306. For example, the duration of the ramp profile 300 may be less than approximately 30, 40, 50, or 60 seconds. Accordingly, the duration of the ramp profile 300 is selected to help restore system frequency, while not allowing sufficient time for additional wear or damage to occur in the power unit. For example, the duration of the ramp profile 300 may be short enough to prevent the possibility of an increased combustor gas temperature soaking into the blades, shrouds, and components in the turbine section.

Figure 6:
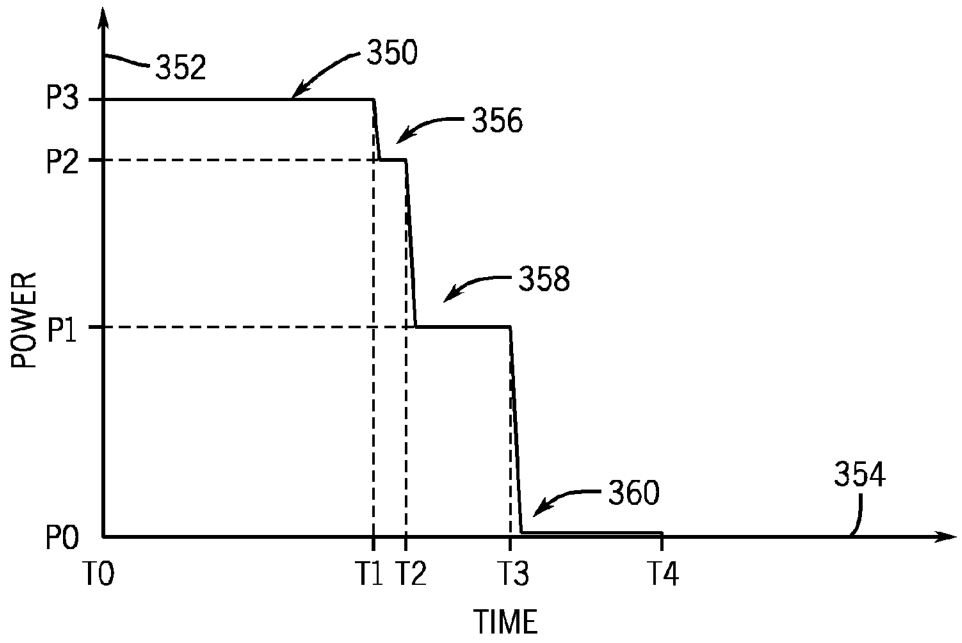
FIG. 6 is a graph of generator power versus time of a tract mode of an event responsive controller, illustrating a downward ramp profile.

FIG. 6 is a graph of a downward ramp profile 350 of power 352 versus time 354 of a tract mode of an event responsive controller. As illustrated, the downward ramp profile 350 rapidly decreases power 352 over a relatively short duration of time 354 in response to a utility signal indicative of a grid destabilizing event. The downward ramp profile 350 is configured to stabilize the power unit and/or the power grid, e.g., by maintaining synchronization of frequencies.

At a time T1, the downward ramp profile 350 initiates a first downward ramp or step 356 from a power level P3 to a power level P2. At a time T2, the downward ramp profile 350 initiates a second downward ramp or step 358 from the power level P2 to a power level P1. At a time T3, the downward ramp profile 350 initiates a third downward ramp or step 360 from the power level P1 to a power level P0. In the illustrated embodiment, the power level P3 may correspond to a power level at or below a 100 percent operating state of the power unit. The power level P0 may correspond to a minimal or shut-down operating state of the power unit.

In response to a utility signal representative of a grid destabilizing event, the event responsive controller may trigger the downward ramp profile 350 to decrease along the downward ramp steps 356, 358, and 360 over the duration of time T1 to time T4. In other words, the downward ramp profile 350 may begin reductions in speed and power of the power unit in real-time in response to the utility signal indicative of the grid stabilizing event. The initiation of the first downward ramp or step 356 at the time T1 may occur at a time between approximately 0 to 10 seconds, or at least less than approximately 1, 2, 3, 4, 5, 6, 7, 8, 9, or 10 seconds, after the occurrence of the grid destabilizing event. In certain embodiments, the first downward ramp or step 356 may begin at the time T1 after less than approximately one second, e.g., less than approximately 100, 200, 300, 400, or 500 milliseconds. Accordingly, the downward ramp profile 350 begins decreasing the power 352 of the power unit rapidly in response to the utility signal. As illustrated, the first downward ramp or step 356 drops power 352 from level P3 to level P2, which may correspond to a power change of approximately 5 to 50 percent. Likewise, the second downward ramp or step 358 drops the power 352 from level P2 to level P1, which may correspond to another drop of power ranging from approximately 5 to 50 percent of the total power. Finally, the third downward ramp or step 360 drops the power 352 from the level P1 to level P0, which again may correspond to a power drop of approximately 5 to 50 percent of the total power.

In certain embodiments, the downward ramp profile 350 may have any suitable downward trend in power 352, either in discrete steps and/or continuous downward paths. For example, the downward ramp profile 350 may follow any number of discrete drops (e.g., the illustrated steps 356, 358, and 360), downward curves, downward slopes, or combinations thereof, from the power level P3 to the power level P0. The ramp profile 350 also may vary depending on the particular power unit and severity of the grid destabilizing event. In some embodiments, the downward ramp profile 350 may not decrease the power level completely to the P0 level. For example, the downward ramp profile 350 may initiate only the first downward ramp 356, or only the first and second downward ramps 356 and 358. Regardless of the particular ramp profile 350, the event responsive controller rapidly decreases the power 352 to provide stabilization prior to significant frequency deviations, load shedding, or other problems on the power grid.

Figure 7:
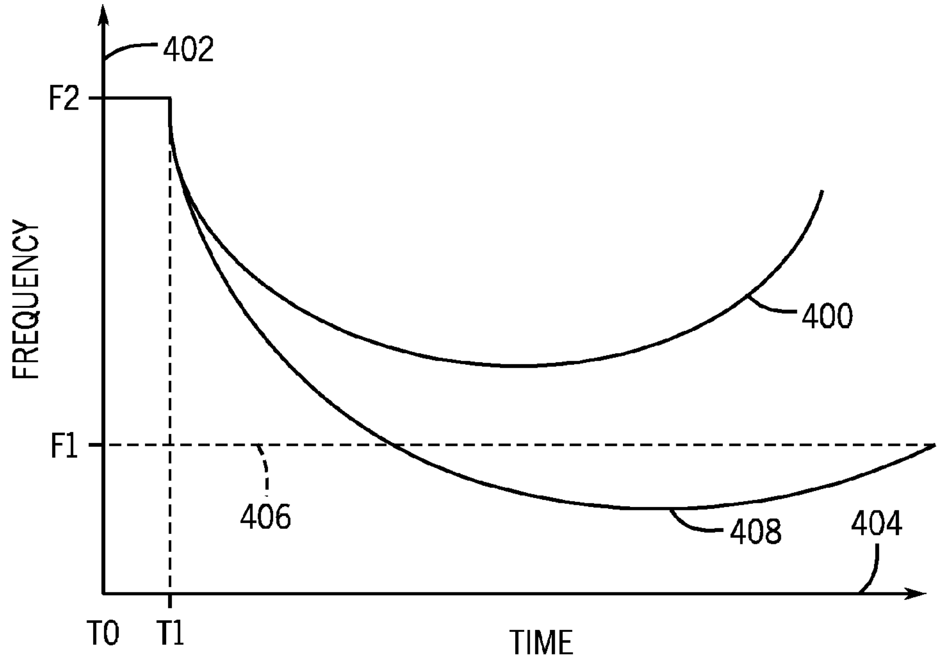
FIG. 7 is a graph of an electrical system (e.g., utility system) frequency versus time in response to a boost mode profile of an event responsive controller.

FIG. 7 is a graph of a boost profile 400 of frequency 402 versus time 404 of a boost mode of an event responsive controller. As illustrated, the boost profile 400 curves upwardly in frequency 402 versus time 404 after engaging a boost mode responsive to a utility signal indicative of a grid destabilizing event. For example, at time T1, a grid destabilizing event may occur while the power is operating at a frequency of F2. The grid destabilizing event may correspond to a trip of a power unit on the power grid, a substantial increase in a load on the power grid, a transmission line fault, or some combination thereof. The grid destabilizing event may cause the load to exceed the available power on the power grid, thereby causing the power units to decrease in speed and frequency relative to the normal operating frequency F2 on the power grid. A frequency F1 may correspond to a lower limit 406 for the frequency. If the frequency falls below the lower limit 406, the system may begin shedding loads to avoid damage to equipment. For example, the frequency F2 may correspond to a 60 Hz power frequency on the power grid, while the frequency F2 may correspond to a lower threshold of approximately 59 Hz. As illustrated, a governor profile 408 (i.e., without the event responsive controller) decays in frequency substantially below the lower limit 406, while the boost profile 400 (i.e., using the event responsive controller) curves upwardly substantially above the lower limit 406. Accordingly, the boost profile 400 is able to maintain the frequency 402 within the tolerances or limits of the frequency F2. A similar upper limit exists above the normal operating frequency F2 in the event of over frequency. For example, the upper and lower limits may correspond to frequency thresholds of approximately plus/minus 1, 1.5, or 2 Hz relative to the normal operating frequency F2. However, these upper and lower limits are merely examples for a 60 Hz baseline frequency, and may vary depending on the baseline frequency and/or other considerations.

Similar to FIG. 7, a tract mode may provide a tract profile of frequency versus time to maintain the frequency below an upper threshold or frequency limit (e.g., 61 Hz). For example, the tract profile may be a general mirror image of the boost profile 400 of FIG. 7, relative to the frequency F2. Likewise, a governor profile may be a general mirror image of the governor profile 400 of FIG. 7, relative to the frequency F2. As appreciated, if a substantial load is removed from the electrical grid (e.g., a transmission line fault), then the power units may accelerate causing an over frequency condition. Thus, the tract profile and the governor profile may both exhibit an increase in frequency relative to time, in response to a grid destabilizing event (e.g., a transmission line fault). However, the tract profile may curve downwardly back toward the frequency F2 prior to reaching the upper threshold or frequency limit (e.g., 61 Hz). In contrast, the governor profile may be unable to avoid a frequency rise above the upper threshold. If a power unit accelerates too far (e.g., rotor angle greater than 180 degrees), then the power unit may begin slipping poles and eventually trip. The tract profile may be employed to reduce this acceleration and avoid the trip. For example, a rapid load drop of the power unit may provide a stabilizing function, which could reduce the acceleration sufficiently to avoid an over frequency condition above the upper threshold.

Technical effects of the invention include an event responsive controller configured to stabilize a power generation system in response to severe changes in a power grid. The event responsive controller may be a uniquely programmed computer system, a controller circuit board, a memory, or tangible medium, each having instructions programmed therein. The instructions may include one or more grid stabilizing modes, such as a boost mode and/or a tract mode, that control a power unit to increase or decrease in power output in response to a real-time signal indicative of a grid destabilizing event. In certain embodiments, the grid stabilizing modes override an existing governor of a power unit, e.g., a turbine generator, and provide rapid power changes not possible with the existing governor. As a result of the rapid responsiveness and rapid power changes, the event responsive controller may be able to maintain synchronization of power units with the power grid to prevent load shedding and equipment damage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

a drive;

an electrical generator coupled to the drive;

a controller coupled to the drive, wherein the controller comprises a stabilizing mode responsive to a utility signal representative of a grid destabilizing event; and a second controller coupled to the drive and configured to control the operation of the drive, wherein the controller is configured to override control of the drive from the second controller and control the drive in response to the utility signal representative of a grid destabilizing event.

2. The system of claim 1, wherein the stabilizing mode is configured to counteract a frequency excursion away from a grid frequency of a power grid, wherein the stabilizing mode comprises an override ramp profile to change a power output of the electrical generator to maintain a frequency of the electrical generator within upper and lower limits of the grid frequency.

3. The system of claim 1, wherein the stabilizing mode comprises a drive boost mode responsive to the utility signal representative of the grid destabilizing event, the grid destabilizing event comprises a sudden load increase in a power grid, and the drive boost mode controls the drive to ramp up to an elevated speed to counteract the sudden load increase.

4. The system of claim 3, wherein the drive boost mode comprises an over-control-limit boost mode that controls the drive to ramp up to the elevated speed above a drive control limit for a limited duration of at least up to approximately 60 seconds.

5. The system of claim 1, wherein the stabilizing mode comprises a drive tract mode responsive to the utility signal representative of the grid destabilizing event, the grid destabilizing event comprises a sudden load decrease in a power grid, and the drive tract mode controls the drive to ramp down to a decreased speed to counteract the sudden load decrease.

6. The system of claim 1, wherein the controller initiates the stabilizing mode within at least less than approximately 10 seconds of the grid destabilizing event, and the stabilizing mode comprises a power generation rate change up to at least approximately 1 MW per second.

7. The system of claim 6, wherein the controller initiates the stabilizing mode within at least less than approximately 5 seconds of the grid destabilizing event, and the stabilizing mode has a duration up to at least approximately 60 seconds.

8. The system of claim 1, wherein the drive comprises a turbine engine.

9. The system of claim 1, wherein the drive comprises a reciprocating combustion engine.

10. The system of claim 1, wherein the controller overrides a governor of the drive in response to the utility signal representative of the grid destabilizing event.

11. A system, comprising:

an electrical generator controller comprising a stabilizing mode responsive to a utility signal representative of a grid destabilizing event, wherein the stabilizing mode comprises an override ramp profile to change a power output of an electrical generator to maintain a frequency of the electrical generator within upper and lower limits of a grid frequency, wherein the electrical generator controller is configured to override control of the electrical generator from a second controller in response to the utility signal representative of a grid destabilizing event.

12. The system of claim 11, wherein the upper and lower limits are at least less than approximately 2 Hz above and below the grid frequency of a power grid.

13. The system of claim 11, wherein the stabilizing mode comprises a boost mode responsive to the utility signal representative of the grid destabilizing event, the grid destabilizing event comprises a sudden load increase in a power grid, and the boost mode has the override ramp profile to ramp up the power output to an elevated power output to counteract the sudden load increase.

14. The system of claim 13, wherein the boost mode comprises an over-control-limit boost mode that controls the system to ramp up to the elevated power output above a system limit for a limited duration of at least up to approximately 60 seconds.

15. The system of claim 11, wherein the stabilizing mode comprises a tract mode responsive to the utility signal representative of the grid destabilizing event, the grid destabilizing event comprises a sudden load decrease in a power grid, and the tract mode has the override ramp profile to ramp down the power output to a decreased power output to counteract the sudden load decrease.

16. The system of claim 11, wherein the electrical generator controller initiates the stabilizing mode within at least less than approximately 5 seconds of the grid destabilizing event, the stabilizing mode comprises a power generation rate change up to at least approximately 1 MW per second, and the stabilizing mode has a duration up to at least approximately 60 seconds.

17. The system of claim 11, wherein the electrical generator controller comprises a turbine generator controller, and the stabilizing mode overrides a governor of a turbine coupled to the electrical generator in response to the utility signal representative of the grid destabilizing event.

18. A system, comprising:

a power grid generator configured to supply a power output to a power grid in response to a control signal from a controller, wherein the power grid generator comprises a stabilizing mode triggered by receipt of an override control signal generated by a second controller in response to a utility signal representative of a grid destabilizing event, the override control signal triggering the stabilizing mode within at least less than approximately 5 seconds of the grid destabilizing event, wherein the stabilizing mode comprises a power generation rate change of the power output.

19. The system of claim 18, wherein the power generation rate change is up to at least approximately 1 MW per second, and the stabilizing mode has a duration up to at least approximately 60 seconds.

20. The system of claim 18, wherein the stabilizing mode counteracts the grid destabilizing event to maintain a frequency of the power grid generator within upper and lower limits of a grid frequency, and the upper and lower limits are at least less than approximately 2 Hz above and below the grid frequency of a power grid.

* * * * *